(12) United States Patent
Hong et al.

(10) Patent No.: US 12,030,408 B2
(45) Date of Patent: Jul. 9, 2024

(54) DEVICE FOR UNLOCKING SEAT OF VEHICLE

(71) Applicants: HYUNDAI MOTOR COMPANY, Seoul (KR); KIA CORPORATION, Seoul (KR); DAS Co., Ltd., Gyeongju-si (KR)

(72) Inventors: Deok Gi Hong, Busan (KR); Jae Youn Kim, Ulsan (KR)

(73) Assignees: Hyundai Motor Company, Seoul (KR); Kia Corporation, Seoul (KR); DAS Co., Ltd., Gyeongju-si (KR)

( * ) Notice: Subject to any disclaimer, the term of this patent is extended or adjusted under 35 U.S.C. 154(b) by 43 days.

(21) Appl. No.: 17/969,183

(22) Filed: Oct. 19, 2022

(65) Prior Publication Data
US 2023/0294569 A1 Sep. 21, 2023

(30) Foreign Application Priority Data
Mar. 15, 2022 (KR) ........................ 10-2022-0032210

(51) Int. Cl.
*B60N 2/08* (2006.01)
*B60N 2/12* (2006.01)

(52) U.S. Cl.
CPC ......... *B60N 2/0806* (2013.01); *B60N 2/0818* (2013.01); *B60N 2/0862* (2013.01); *B60N 2/12* (2013.01)

(58) Field of Classification Search
CPC ...... B60N 2/12; B60N 2/0837; B60N 2/0862; B60N 2/0825; B60N 2/0818; B60N 2/146; B60N 2/0806
See application file for complete search history.

(56) References Cited

U.S. PATENT DOCUMENTS

| 4,395,011 A * | 7/1983 | Torta ........................ B60N 2/10 297/335 |
| 5,855,413 A | 1/1999 | Couasnon et al. |
| 2003/0193228 A1 | 10/2003 | Duquesnay et al. |
| 2008/0296949 A1 | 12/2008 | Wieclawski |
| 2021/0354602 A1 | 11/2021 | Hu et al. |

FOREIGN PATENT DOCUMENTS

| DE | 19725365 A1 * | 12/1998 | ............. B60N 2/045 |
| GB | 2298785 A * | 9/1996 | ........... B60N 2/0818 |
| JP | 2005-161987 A | 6/2005 | |
| KR | 10-2003-0073989 A | 9/2003 | |
| KR | 10-0769828 B1 | 10/2007 | |
| KR | 10-1662456 B1 | 10/2016 | |

* cited by examiner

*Primary Examiner* — Milton Nelson, Jr.
(74) *Attorney, Agent, or Firm* — Morgan, Lewis & Bockius LLP

(57) ABSTRACT

A device for unlocking a seat for a vehicle includes a base frame mounted on a movable rail of a seat rail, a seat frame mounted on the base frame to be able to tilt, a lock pin fixed to a side of the seat frame, a support bracket mounted on a floor panel, and a lock plate rotatably mounted on a side of the base frame, and configured to be locked to the lock pin when coming in contact with the support bracket and to be unlocked from the lock pin when coming apart from the support bracket, whereby it is possible to automatically unlock a seat when it is required to tilt the seat through a walk-in mechanism to secure a passage for a passenger to get in/out of a vehicle.

13 Claims, 7 Drawing Sheets

DEVICE FOR UNLOCKING SEAT OF VEHICLE

CROSS REFERENCE TO RELATED APPLICATION

The present application claims priority to Korean Patent Application No. 10-2022-0032210, filed Mar. 15, 2022, the entire contents of which is incorporated herein for all purposes by this reference.

BACKGROUND OF THE PRESENT DISCLOSURE

Field of the Present Disclosure

The present disclosure relates to a device for unlocking a seat for a vehicle, and more particularly, to a device for unlocking a seat for a vehicle, the device making it possible to easily unlock a seat for walk-in operation for securing a passage for passengers to get in/out of a vehicle.

Description of Related Art

In general, in a vehicle with three or more rows of seat, a walk-in function for securing a passage for passengers to get in/out of a vehicle can be implemented through two or more steps of actions including an action of reclining forward the seatbacks of the seats in the second row and an action of sliding forward all of the seats of the second row.

However, it is inconvenient for a user to manually perform two or more separate actions including the operation of reclining seatbacks forward and the operation of sliding all of the seats forward thereof.

To remove the present inconvenience and more easily secure a passage for getting-in/out of a vehicle, a walk-in mechanism that can tilt an entire seat including a seat cushion and a seatback is applied.

Because a seat is fixed by a seat lock for safety before the walk-in mechanism is performed, the seat locked by the seat lock should be unlocked as a precondition for performing the walk-in mechanism.

In general, such a seat lock is composed of a latch assembly which is disposed between a side of a seat cushion frame and a seat rail for moving forward/rearward a seat, and an actuator or a manual lever which is connected to the latch assembly through a cable.

Accordingly, a seat is unlocked through a step of supplying power to the actuator when a user operates a switch, a step of pulling the cable by the actuator, and a step of unlocking the latch assembly while the cable is pulled, whereby operation for tilting a seat by the walk-in mechanism may be achieved.

Alternatively, a seat is unlocked through a step of pulling the cable when a user operates a manual lever and a step of unlocking the latch assembly while the cable is pulled, whereby operation for tilting a seat by the walk-in mechanism may be achieved.

However, such a seat lock of the related art requires many parts including a latch assembly of several parts, a cable, an actuator, a manual lever, etc., so there is a problem that the manufacturing cost and the weight are increased due to many parts and the layout for installing the parts is complicated.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device for unlocking a seat for a vehicle, the device sliding a seat a predetermined distance or more forward so that the seat may be automatically easily unlocked when it is required to tilt the seat through a walk-in mechanism to secure a passage for passengers to get in/out of a vehicle.

To achieve the objectives, the present disclosure provides a device for unlocking a seat for a vehicle, the device including: a base frame mounted on a movable rail of a seat rail: a seat frame mounted on the base frame to be configured to tilt: a lock pin fixed to a side of the seat frame; a support bracket mounted on a floor panel, and a lock plate rotatably mounted on a side of the base frame, and configured to be locked to the lock pin when coming in contact with the support bracket and to be unlocked from the lock pin when coming apart from the support bracket.

The lock plate may be provided in a structure in which a hook portion configured to be detachably coupled to the lock pin is formed at an upper portion and a lever portion configured to come in contact with the support bracket is formed at a lower portion.

A rotation support hole may be formed at a middle portion of the lock plate and a rotation support shaft inserted in the rotation support hole may be mounted on a side of the base frame.

A lock pin insertion locking groove being open rearward may be formed at the hook portion.

A horizontal guide surface for horizontal contact with the support bracket may be formed on a bottom portion of the lever portion.

A return spring configured to provide an elastic return force for rotating the lock plate forward, which is an unlocking direction, may be connected between the lock plate and the base frame.

A spring fixing end portion configured to hold and fix an end portion of the return spring may be formed on a rear surface of a middle portion of the lock plate.

The support bracket may include: a fixed plate mounted on the floor panel while surrounding a fixed rail of the seat rail; and a guide formed on a side of the fixed plate and configured to come in contact with a bottom portion of the lock plate.

A length of the guide may be greater than an advance distance set to adjust a front and rear position of the movable rail and may be smaller than a maximum advance distance of the movable rail.

A guide plate vertically bending to guide a hook portion of the lock plate to the lock pin may be further mounted on the seat frame.

The present disclosure provides the following effects through the objectives described above.

First, it is possible to automatically and easily unlock a seat by moving the seat forward over a predetermined distance when it is required to tilt the seat using a walk-in mechanism to secure a passage for a passenger to get in/out of a vehicle, and accordingly, the seat may be smoothly tilted by the walk-in mechanism.

Second, as compared with a seat locking device configured by combining many portions Generally, it is possible to reduce the number of portions and the manufacturing cost and it is possible to improve convenience of assembly because the layout is simplified.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
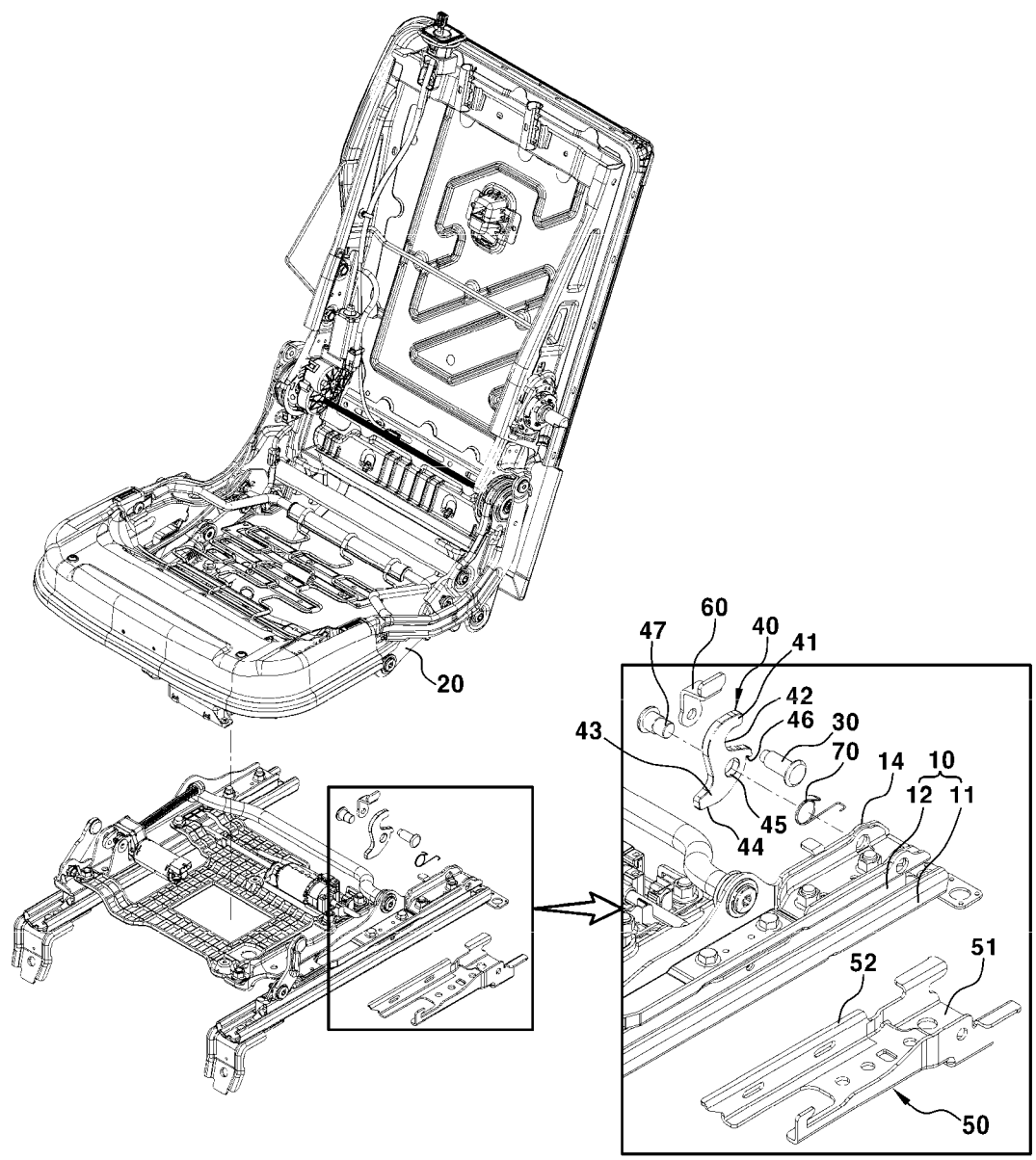
FIG. 1 is an exploded perspective view showing a device for unlocking a seat for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

Figure 2A:
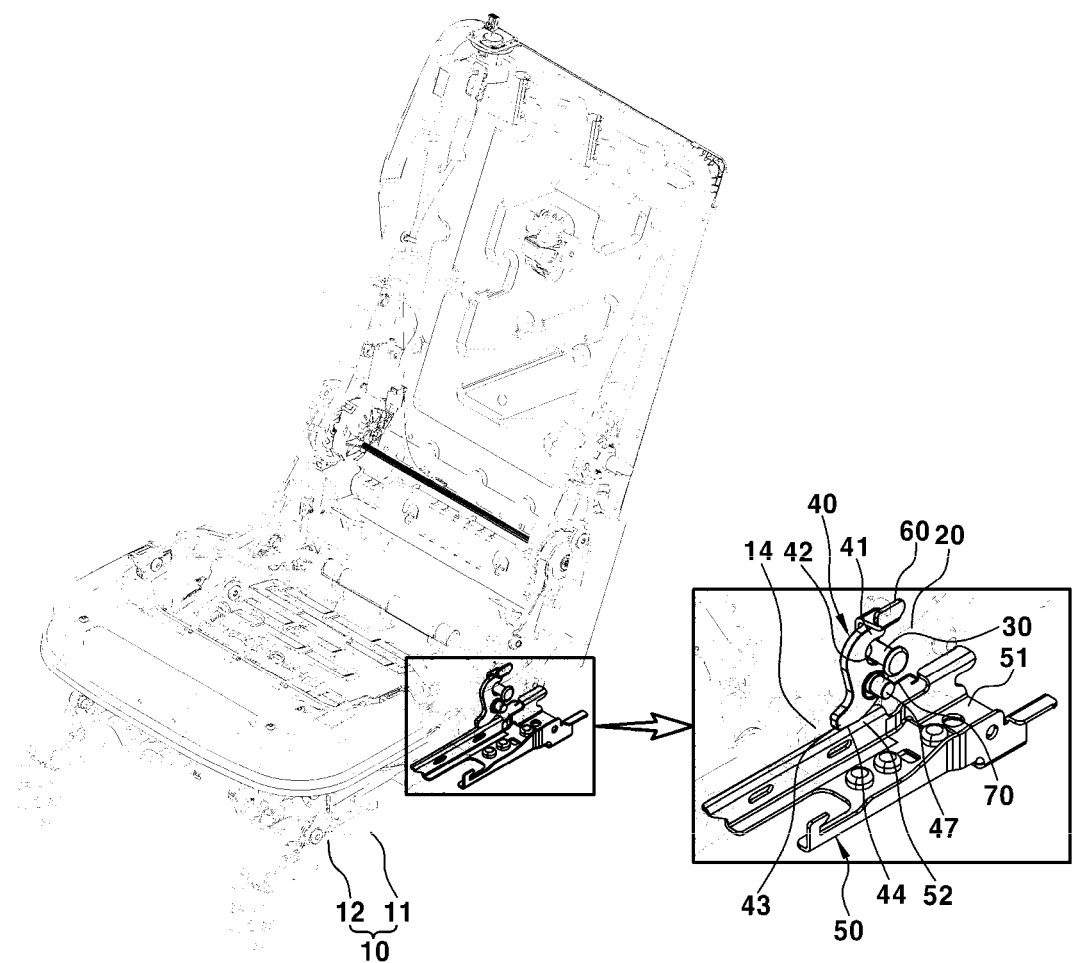
FIG. 2A and FIG. 2B are assembled perspective views showing the device for unlocking a seat for a vehicle according to an exemplary embodiment of the present disclosure.
Figure 2B:
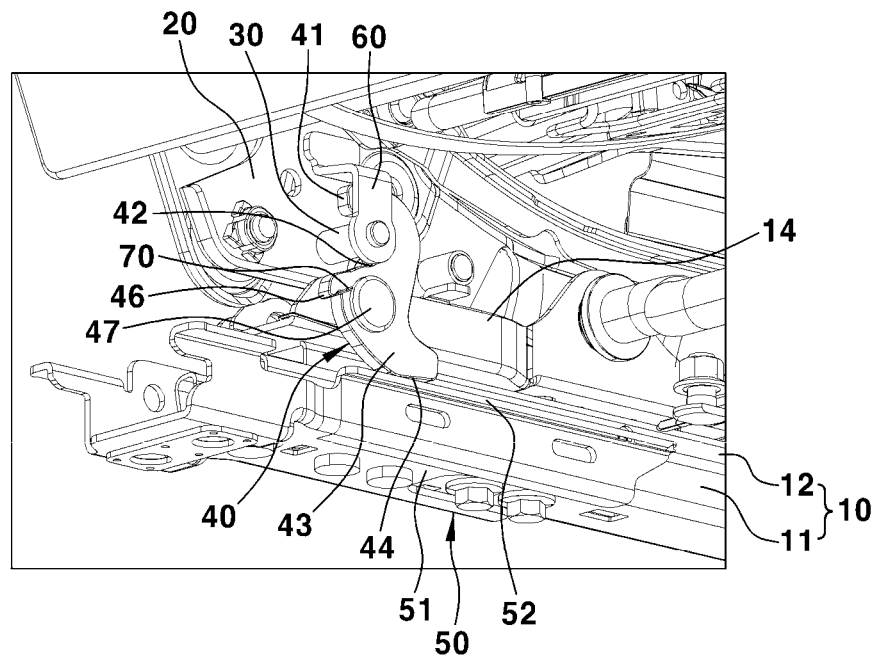

FIG. 1 is an exploded perspective view showing a device for unlocking a seat for a vehicle according to an exemplary embodiment of the present disclosure, FIG. 2A is an assembled perspective view emphasizing components of the device for unlocking a seat for a vehicle according to an exemplary embodiment of the present disclosure, and FIG. 2B is a perspective view showing an assembled state in which the components of the device for unlocking a seat for a vehicle according to an exemplary embodiment of the present disclosure are positioned substantially inside a seat, in which reference numeral 10 indicates a seat rail.

The seat rail 10 includes a fixed rail 11 mounted to be fixed to a floor panel and a movable rail 12 fastened to the fixed rail 11 to be configured to slide forward and rearward thereof.

A base frame 14 is coupled on the movable rail 12 and a seat frame 20 is connected to the base frame 14 to be configured to tilt, whereby when the movable rail 12 slides forward or rearward along the fixed rail 11, the base frame 14 and the seat frame 20 can also be moved forward or rearward thereof.

Because when the movable rail 12 slides forward or rearward along the fixed rail 11, the base frame 14 and the seat frame 20 can also be moved forward or rearward thereof, whereby the front and rear position of the entire seat may be adjusted.

According to an exemplary embodiment of the present disclosure, a lock pin 30 is fixed at the rear end portion of a side of the seat frame 20 and a lock plate 40 which is detachably locked to the lock pin 30 is rotatably mounted at the rear end portion of a side of the base frame 14.

A support bracket 50 is mounted on the floor panel to which the fixed rail 11 of the seat rail 10 is fixed. The support bracket 50 includes a fixed plate 51 mounted on the floor panel while surrounding the lower portion of the fixed rail 11, and a guide 52 bending upwards from a side of the fixed plate 51 and coming in contact with the bottom portion of the lock plate 40.

The top portion of the guide 52 may be made flat for horizontal contact with the bottom portion of the lock plate 40 and the length of the guide 52 is greater than an advance distance set for adjusting the front and rear position of the movable rail 12 (the front and rear position of the seat) and is smaller than the maximum advance distance of the movable rail 12, and the reason will be described in more detail below.

The lock plate 40 is rotatably mounted on a side of the base frame 14, so that the lock plate 40 may be locked to the lock pin 30 when coming in contact with the support bracket 50 and may be unlocked from the lock pin 30 when coming apart from the support bracket 50.

To the present end, the lock plate 40 has a hook portion 41 at the upper portion which is detachably locked to the lock pin 30, and a lever portion 43 that comes in contact with the guide 52 of the support bracket 50.

A lock pin insertion locking groove 42 being open rearward so that the lock pin 30 may be detachably inserted therein in is formed at the hook portion 41 of the lock plate 40.

The bottom portion of the lever portion 43 of the lock plate 40 is a horizontal guide surface 44 that horizontally comes in contact with the flat top of the guide 52 of the support bracket 50.

A rotation support hole 45 is formed at the middle portion of the locking plate 40 and a rotation support shaft 47 which is inserted in the rotation support hole 45 is fastened to a side of the base frame 14, whereby the lock plate 40 may be rotated forward and rearward on the rotation support shaft 47.

A return spring 70 is connected to predetermined positions of the lock plate 40 and the base frame 14 therebetween. The return spring 70 generates an elastic return force that rotates the lock plate 40 forward which is the unlocking direction thereof.

A spring fixing end portion 46 that holds and fixes an end portion of the return spring 70 may protrude from the rear surface of the middle portion of the lock plate 40.

An end portion of the return spring 70 is fixed to the spring fixing end portion 46 of the lock frame 40 and another end portion thereof is fixed to a rear end portion of the base frame 14, the lock plate 40 may be rotated forward, which is the unlocking direction, by the elastic return force of the return spring 70.

A guide plate 60 vertically bending to guide the hook portion 41 to the lock pin 30 when the lock plate 40 is rotated rearward which is the locking direction and to prevent the hook portion 41 from separating to the left and right when the hook portion 41 is coupled to the lock in 30 is further mounted on the seat frame 20.

The operational flow of the device for unlocking a seat for a vehicle that has the present configuration of the present disclosure is described hereafter.

Figure 3:
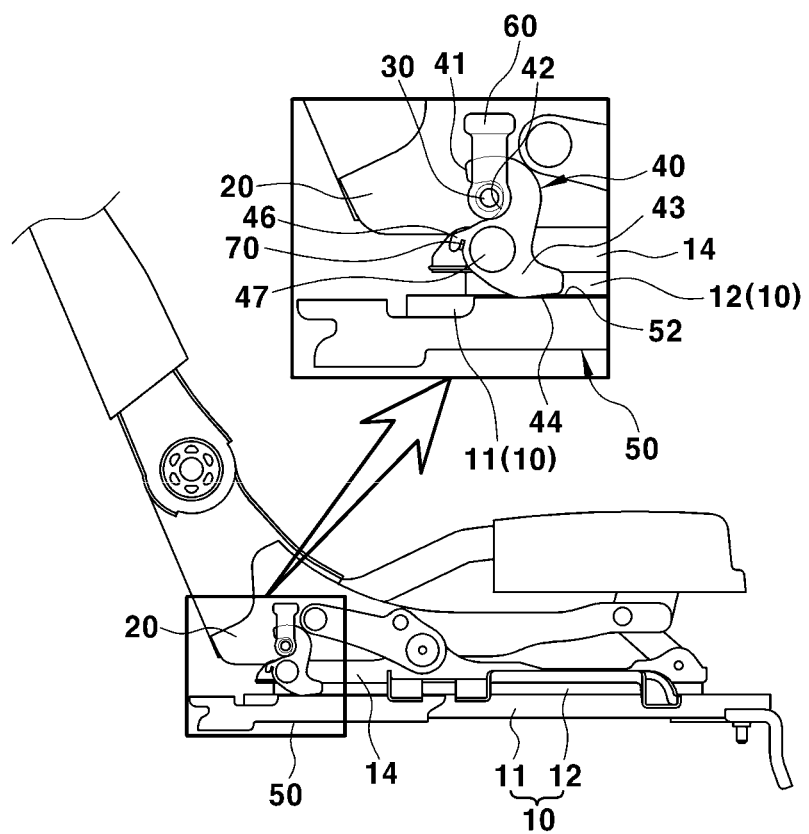
FIG. 3, FIG. 4, and FIG. 5 are side cross-sectional views showing an operation state of the device for unlocking a seat for a vehicle according to an exemplary embodiment of the present disclosure.

FIG. 3 is a side cross-sectional view showing a locked state of the device for unlocking a seat for a vehicle according to an exemplary embodiment of the present disclosure.

As shown in FIG. 3, when the horizontal guide surface 44 of the lock plate 40 is in contact with the top portion of the guide 52 of the support bracket 50, the lock plate 40 has been rotated rearward thereof, which is the locking direction, and locked to the lock pin 30.

That is, when the horizontal guide surface 44 of the lock plate 40 is in contact with the top portion of the guide 52 of the support bracket 50, the lock pin 30 has been inserted in the lock pin insertion locking groove 42 formed at the hook portion 41 of the lock plate 40.

In the present state, the lock plate 40 is tried to be rotated forward which is the unlocking direction by the elastic return force of the return spring 70, but the horizontal guide surface 44 of the lock plate 40 is held in contact with the top portion of the guide 52 of the support bracket 50, so that the lock plate 40 is not rotated forward which is the unlocking direction.

Therefore, the seat frame 20 is not tilted for walk-in when the lock plate 40 mounted on the base frame 14 is locked on the lock pin 30 mounted on the seat frame 20.

Meanwhile, because the length of the guide 52 of the support bracket 50 is greater than the advance distance (e.g., 135 mm) set to adjust the front and rear position of the movable rail 12 (to adjust the front and rear position of the seat), as described above, when the movable rail 12 slides forward along the fixed rail 11 (e.g., 135 mm or less), the base frame 14 and the seat frame 20 are also moved forward together, whereby the position of the entire seat may be easily adjusted.

Furthermore, because when the movable rail 12 slides forward along the fixed rail 11 (e.g., 135 mm or less), the horizontal guide surface 44 of the lock plate 40 keeps in contact with the top portion of the guide 52 of the support bracket 50, so that the lock plate 40 can keep locked to the locking pin 30. Accordingly, the seat frame 20 is not tilted for walk-in for safety.

Figure 4:
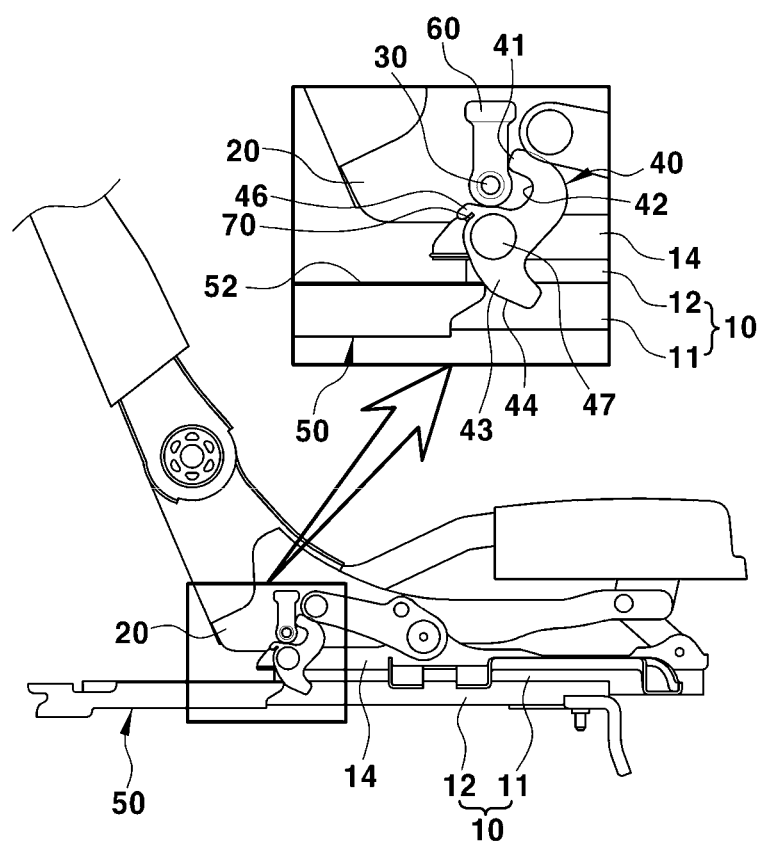
Figure 5:
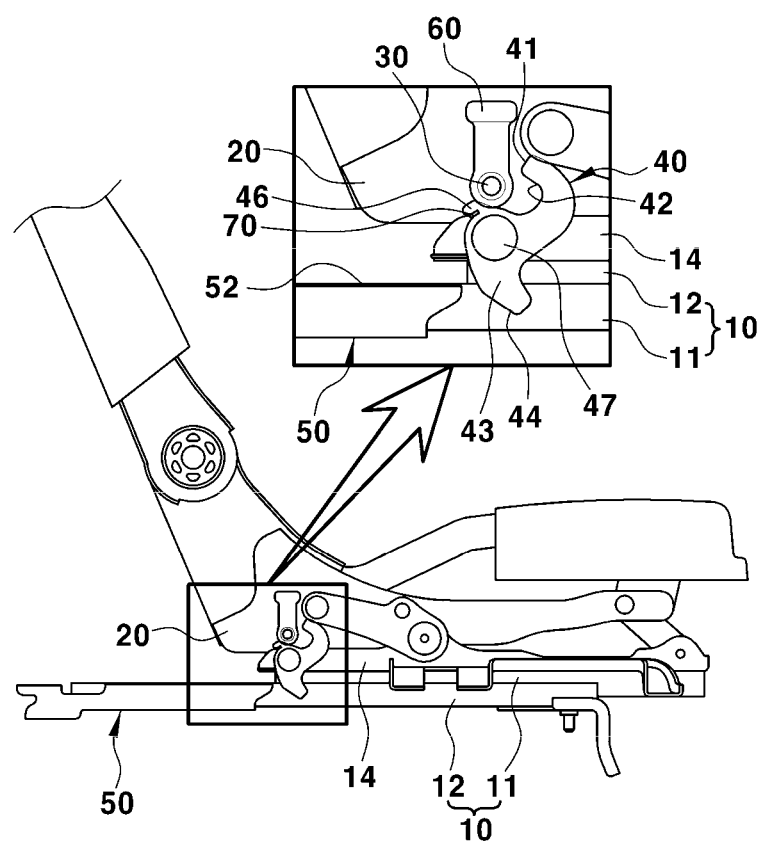

FIG. 4 and FIG. 5 are side cross-sectional view showing an operation state for unlocking of the device for unlocking a seat for a vehicle according to an exemplary embodiment of the present disclosure.

When it is required to tilt a seat using a walk-in mechanism to secure a passage for a passenger to get in/out of a vehicle, a user moves the movable rail 12 over the advance distance (e.g., 135 mm) set to adjust the front and rear position (to adjust the front and rear position of the seat).

For reference, the walk-in mechanism is a well-known electric or manual mechanism which is provided at a seat to tilt forward the entire seat including a seatback and a seat cushion so that the seatback is vertically erected, and is not associated with the essence of the present disclosure, so it is not described in detail.

Of course, when the movable rail 12 slides forward over the set advance distance (e.g., 135 mm) along the fixed rail 11, the base frame 14 and the seat frame 20 are also moved forward together, so that the entire seat is moved over the advance distance e.g., 135 mm) set to adjust the front and rear position of the seat.

Furthermore, when the movable rail 12 slides forward over the set advance distance (e.g., 135 mm), the lock plate 40 may be detached from the support bracket 50.

That is, when the movable rail 12 slides forward over a total of 145 mm maximally up to 200 mm by exceeding about 10 mm further than the set advance distance (e.g., 135 mm), the horizontal guide surface 44 of the lock plate 40, as shown in FIG. 4 and FIG. 5, comes apart from the guide 52 of the support bracket 50, whereby the lock plate 40 may be unlocked.

At the moment the horizontal guide surface 44 of the lock plate 40 comes apart from the guide 52 of the support bracket 50, the lock plate 40 is rotated forward, which is the unlocking direction, by the elastic return force of the return spring 70, whereby the lock pin 30 comes out of the lock pin insertion locking groove 42 formed at the hook portion 41 of the lock plate 40. Accordingly, the lock plate 40 is unlocked.

In the present state, because the base frame 14 is coupled on the movable rail 12 and the seat frame 20 is connected to the base frame 14 to be configured to tilt, the seat frame 20 may be tilted forward by unlocking of the lock plate 40.

Figure 6:
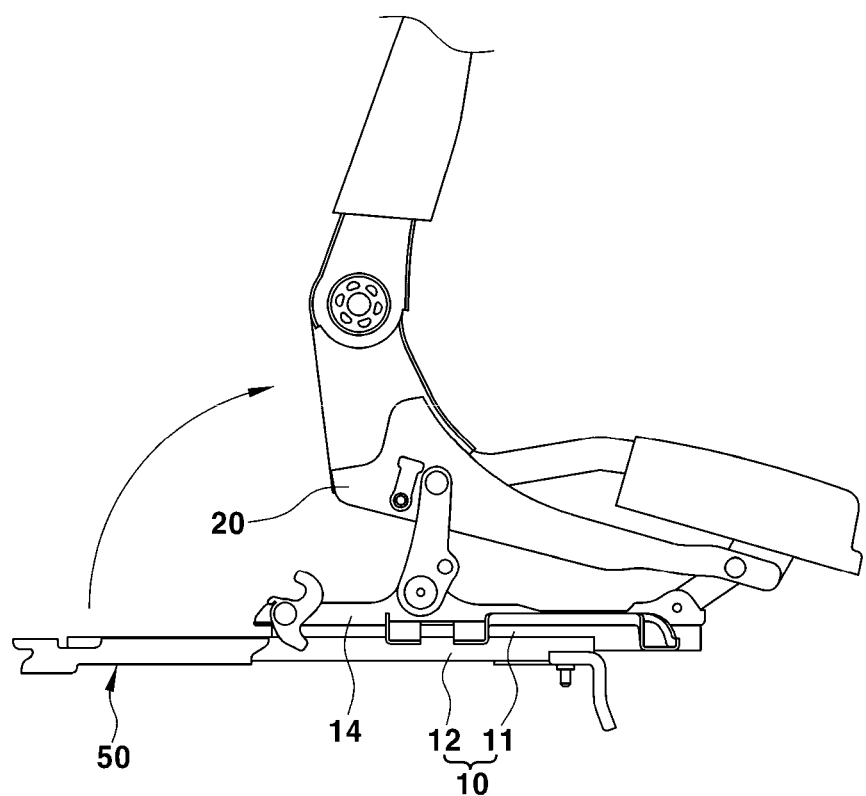
FIG. 6 is a side view showing a walk-in operation track of a seat by operation of a walk-in mechanism for a seat after the seat is unlocked by the device for unlocking a seat for a vehicle according to an exemplary embodiment of the present disclosure.

Therefore, because the seat is tilted by the walk-in mechanism, the entire seat including a seat cushion and a seatback is tilted and simultaneously the seatback is vertically erected, as shown in FIG. 6, it is possible to secure a wide and convenient passage for passengers of the third-row seats to get in/out of a vehicle.

As described above, it is possible to automatically and easily unlock a seat by moving the seat forward over a predetermined distance when it is required to tilt the seat using a walk-in mechanism to secure a passage for a passenger to get in/out of a vehicle, and accordingly, the seat may be smoothly tilted by the walk-in mechanism.

It was described above that the device for unlocking a seat for a vehicle of the present disclosure may be used to easily unlock a seat for walk-in operation, but the device may be used for various purposes such as controlling operation of a slide lever for operating a movable rail, controlling reclining and tilting angles of a manual seat or an electric seat, locking and unlocking a headrest and an armrest, and controlling opening angles of a door and a tail gate.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for unlocking a seat, the apparatus comprising:
   a base frame mounted on a movable rail of a seat rail;
   a seat frame mounted on the base frame and tiltable;
   a lock pin fixed to a side of the seat frame;
   a support bracket mounted on a floor panel;
   a lock plate rotatably mounted on a side of the base frame, and configured to be locked to the lock pin when the lock plate comes in contact with the support bracket and to be unlocked from the lock pin when the lock plate comes apart from the support bracket; and
   a guide plate mounted on the seat frame and formed to be bent to guide a hook portion of the lock plate to the lock pin between the seat frame and the guide plate.

2. The apparatus of claim 1, wherein the lock plate includes:
   a hook portion formed at a first portion of the lock plate and configured to be detachably coupled to the lock pin; and
   a lever portion formed at a second portion of the lock plate and configured to selectively come in contact with the support bracket.

3. The apparatus of claim 2, wherein the hook portion and the lever portion are aligned in opposite direction to each other.

4. The apparatus of claim 2, further includes a guide plate mounted on the seat frame and formed to be bent to guide the hook portion of the lock plate to the lock pin between the seat frame and the guide plate.

5. The apparatus of claim 2, further including a horizontal guide surface formed on a bottom portion of the lever portion and configured for horizontal contact with the support bracket.

6. The apparatus of claim 2, further including a lock pin insertion locking groove formed at the hook portion to be open rearward, wherein the lock pin is selectively accommodated in the lock pin insertion locking groove.

7. The apparatus of claim 1, further including:
   a rotation support hole formed at a middle portion of the lock plate; and
   a rotation support shaft inserted into the rotation support hole and mounted on a side of the base frame.

8. The apparatus of claim 1, further including a return spring connected between the lock plate and the base frame and configured to provide an elastic return force for rotating the lock plate forward, which is an unlocking direction.

9. The apparatus of claim 8, wherein a spring fixing end portion holding and fixing an end portion of the return spring is formed on a rear surface of a middle portion of the lock plate.

10. The apparatus of claim 1, wherein the support bracket includes:
    a fixed plate mounted on the floor panel while surrounding a fixed rail of the seat rail, the fixed rail being fastened to the movable rail; and
    a guide formed on a side of the fixed plate and configured to come in contact with a bottom portion of the lock plate.

11. The apparatus of claim 10, wherein a length of the guide is greater than an advance distance set to adjust a front and rear position of the movable rail and is smaller than a maximum advance distance of the movable rail.

12. An apparatus for unlocking a seat, the apparatus comprising:
    a base frame mounted on a movable rail of a seat rail;
    a seat frame mounted on the base frame and tiltable;
    a lock pin fixed to a side of the seat frame;
    a support bracket mounted on a floor panel; and
    a lock plate rotatably mounted on a side of the base frame, and configured to be locked to the lock pin when the lock plate comes in contact with the support bracket and to be unlocked from the lock pin when the lock plate comes apart from the support bracket,
    wherein the support bracket includes:
      a fixed plate mounted on the floor panel while surrounding a fixed rail of the seat rail, the fixed rail being fastened to the movable rail; and
      a guide formed on a side of the fixed plate and configured to come in contact with a bottom portion of the lock plate.

13. An apparatus for unlocking a seat, the apparatus comprising:
    a base frame mounted on a movable rail of a seat rail;
    a seat frame mounted on the base frame and tiltable;
    a lock pin fixed to a side of the seat frame;
    a support bracket mounted on a floor panel; and
    a lock plate rotatably mounted on a side of the base frame, and configured to be locked to the lock pin when the lock plate comes in contact with the support bracket and to be unlocked from the lock pin when the lock plate comes apart from the support bracket,
    wherein the lock plate includes:
      a hook portion formed at a first portion of the lock plate and configured to be detachably coupled to the lock pin; and
      a lever portion formed at a second portion of the lock plate and configured to selectively come in contact with the support bracket, and
    wherein the apparatus further includes a guide plate mounted on the seat frame and formed to be bent to guide the hook portion of the lock plate to the lock pin between the seat frame and the guide plate.

* * * * *